Patented Feb. 25, 1936

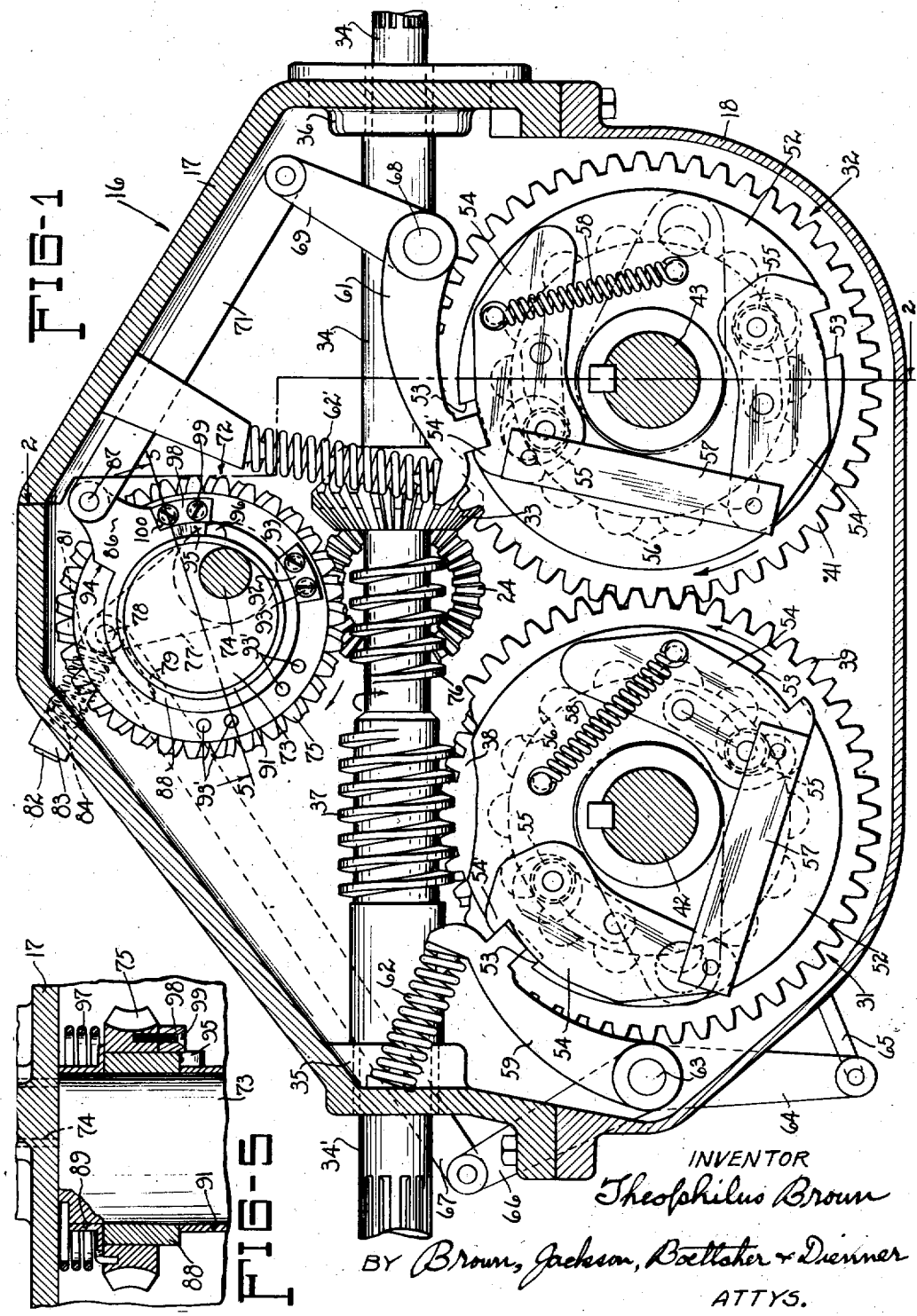

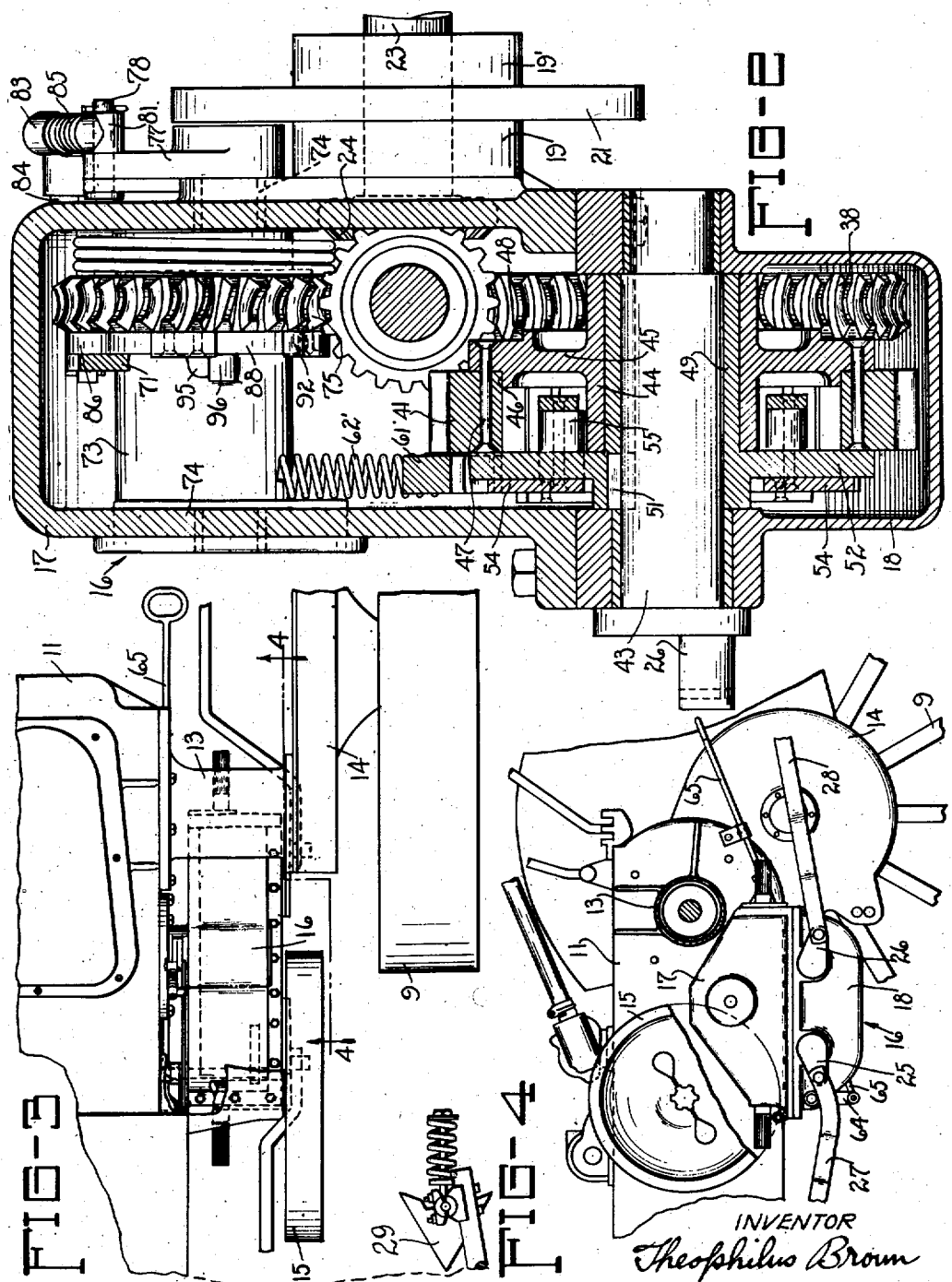

2,031,758

UNITED STATES PATENT OFFICE 2,031,758

TRACTOR

Theophilus Brown, Moline, Ill., assignor to Deere & Company, Moline, Ill., a corporation of Illinois Application May 5, 1930, Serial No. 449,859
Renewed January 5, 1934

31 Claims. (Cl. 97—51)

The present invention relates to tractors, or agricultural implements, and is concerned primarily with the provision of improved power operated means for actuating certain implement parts in a particular timed relation.

The invention is perhaps of greatest utility for raising and lowering the cultivator rigs of tractor propelled cultivators, and accordingly I shall describe it in this embodiment, but, as hereinafter explained, the invention is not necessarily limited to this specific use. It is frequently the practice in these tractor propelled cultivators to dispose one set of cultivator rigs adjacent to the front end of the tractor, and to dispose another set of rigs adjacent to the rear end thereof, these rigs being either mounted directly on the tractor or having their own wheel supported frames connected with the tractor. Heretofore, in the transmission of power lift energy from the tractor to these rigs both sets of rigs have been raised to inoperative position substantially simultaneously, and also lowered to operative position substantially simultaneously. This has been found to be objectionable, because in lifting the rigs at the ends of the rows the rear rigs will not advance as far as the front rigs before lifting, and hence these ends of the rows will be cultivated only by the front rigs; and, because in lowering the rigs at the start of each new set of rows the front set of rigs will not enter the soil as far back as the rear set, and consequently these ends of the rows will be cultivated only by the rear set of rigs.

The principal object of the present invention is to provide improved power lift mechanism which will automatically time the raising or lowering of the rigs in proper sequence to avoid such objection. That is to say, by the use of the present mechanism the lifting of the rear set of rigs is delayed after the lifting of the front set until the tractor has advanced a distance approximately equal to the distance between the two sets of rigs, whereby substantially the same amount of ground is gone over or cultivated by both sets of rigs; and, likewise, the lowering of the rear set of rigs is delayed after the lowering of the front set of rigs until the tractor has advanced through substantially the same distance, whereby both sets of rigs enter the ground substantially at the same point.

Another object is to provide such a mechanism in which the time interval between the rig movements can be adjusted.

Another object is to provide mechanism having the above characteristic operation which can be tripped for either raising or lowering the rigs by a simple manual operation; which will automatically restore the timing mechanism to initial position; which will be positive and reliable in its operation; and which can be constructed as an attachment for ready mounting on the tractor to derive its operating energy from the motor thereof, without necessitating extensive alteration or redesigning of the tractor.

Other objects and advantages of the invention will appear from the following detail description of one preferred embodiment thereof. In the accompanying drawings illustrating such embodiment:

Figure 1 is a sectional view of the mechanism, taken substantially longitudinally of the tractor and on a plane just inside of the front wall of the housing enclosing said mechanism;

Figure 2 is a sectional view at right angles thereto, taken approximately on the plane of the line 2—2 of Figure 1;

Figure 3 is a fragmentary plan view showing a portion of the tractor with the present power lift mechanism associated therewith;

Figure 4 is a vertical cross sectional view taken approximately on the plane of the line 4—4 of Figure 3;

Figure 5 is a detail sectional view through the timing mechanism, taken approximately on the plane of the line 5—5 of Figure 1.

The present power lift mechanism is capable of adaptation to any desired type of tractor. Figures 3 and 4 illustrate on a larger scale the rear portion of a conventional design of tractor. As there shown, the tractor comprises rear traction wheels 9 driven through transmission mechanism enclosed in a housing 11. The front steering wheels are indicated at 10.

The cultivator attachment for the front end of the tractor is similar in many respects to that disclosed in my Patent No. 1,895,648, dated January 31, 1933, and is also similar to that shown and claimed in Letters Patent No. 1,955,789, issued April 24, 1934, to Theodore W. Johnson and myself, and hence it is not believed necessary to describe all of the details of this front attachment.

The frame portion of the front attachment comprises a transverse supporting bar built up of an intermediate section 101 and two lateral outrigger sections 101'. The intermediate section 101 is supported in a U-shaped bracket 102 pivotally connected to a bracket 103 mounted on the front end of the tractor, the U-shaped bracket 102 being free to rock or swivel about a longitudinally extending axis. Bracket arms 104 are secured to the end portions of the front wheel axle 105 and extend up to assist in supporting the ends of the intermediate bar section 101. Hinge joints 106 connect the outrigger sections 101' with the intermediate section 101 whereby the outrigger sections can rise and fall relatively to the intermediate section as the supporting wheels 107 at the ends of these outrigger sections pass over uneven ground. Diagonal reinforcing bars 108 extend inwardly and rearwardly from the outer ends of the outrigger sections and have pivotal mounting at 109 on the sides of the tractor so as to accommodate such rising and falling movement.

Disposed in rear of the front frame bar 101, 101' and extending substantially parallel therewith is a rock shaft consisting of an intermediate section 110 and two outwardly extending sections 110'. These rock shaft sections are supported in bearings carried by the intermediate frame section 102 and by braces 111 on the outrigger frame sections, and the inner ends of the outer shaft sections 110' are coupled to the intermediate section 110 through universal joints which permit the outer sections to rise and fall with the outrigger frames. The power lift movement for raising and lowering all of the front rigs and the master depth adjustment for simultaneously adjusting the cultivating depth of all of these front rigs, are effected by means of this rock shaft which carries arms connected, respectively, with the several tools or rigs.

In the three-row type of cultivator, the intermediate frame bar 101 supports an intermediate pair of cultivating rigs 29, and the outrigger frame bars 101' each support a pair of laterally disposed rigs 29, said rigs being provided with any suitable type of earth working tool or tools. It is not believed to be necessary to describe herein the particular means for supporting the rigs from the frame bars 101, 101', as a full showing and description thereof can be had by referring to the above-mentioned patent of myself and Theodore W. Johnson, if desired.

Rocking movement is transmitted to the three sections of the rock shaft 110—110' through an arm 112 extending upwardly from one of these sections, which arm is connected with the power lift mechanism as hereinafter described. Master depth adjustment of all the front cultivator rigs is provided by means of the depth adjusting rod 113 suitably connected at its forward end to said arm 112 and extending rearwardly to a position adjacent the operator's position on the tractor.

At the rear of the tractor are mounted two rear cultivating rigs 114 having their front ends pivotally supported at 115 on the tractor. The power lift of the rear rigs is effected through a rock shaft 116 pivotally supported in bearing brackets 117 secured to the rear edge of the operator's platform. The rear rigs are suitably connected with the rock shaft so as to be raised and lowered by the rocking thereof. Rocking movement is transmitted to the rear rock shaft 116 through an arm 118 suitably connected with the power lift mechanism, as hereinafter described.

The preferred means, according to the present invention, for operating the front and rear rock shafts 110 and 116 will now be described. Jack shafts, connecting with a differential mechanism in the transmission housing 11, extend outwardly through housing extensions 13 into chain drive housings 14 enclosing sprocket gears and chains for transmitting the drive from these jack shafts to the hubs of the main traction wheels 9. In this type of tractor the motor is disposed adjacent to the front end thereof with its crank shaft extending transversely, the fly wheel 15 being mounted on one end of said crank shaft. The present power lift mechanism is indicated in its entirety at 16, and when associated with a tractor of the above general description it is preferably disposed at the side of the transmission mechanism housing 14 substantially as shown, but, as above remarked, this power lift mechanism can be differently located and differently arranged on other designs of tractors.

Referring to Figures 1 and 2, said mechanism is enclosed in a housing comprising upper and lower sections 17 and 18 suitably bolted together. Projecting laterally from the upper housing section is a boss 19 having an attaching flange 21 projecting radially therefrom. The inner end 19' of this boss is adapted to be inserted into an opening in the side wall of the transmission mechanism housing 11, and the flange 21 is adapted to be secured to said side wall by bolts, whereby the entire power take-off unit can be readily mounted on the tractor and dismounted therefrom. Rotatably journaled in the boss 19 is a shaft 23 having a beveled gear 24 mounted on its outer end within the power take-off housing, this shaft and gear constituting the power operated driving means for transmitting driving energy to the two lifting elements of the mechanism. As shown in Figure 4, these lifting elements preferably comprise front and rear cranks 25 and 26 which are rotatably supported on the outer side of the power take-off housing and are connected through any suitable motion transmitting linkages 27 and 28 with the front and rear rock shafts 110 and 116, respectively, which are operatively connected through lifting arms, as mentioned above, with the front and rear sets of cultivator rigs respectively. The inner end of the drive shaft 23 may be operatively connected to receive power from the motor of the tractor through any suitable arrangement of driving parts, such as, for example, that disclosed in Letters Patent No. 1,933,539, issued November 7, 1933, to myself and Linwood A. Murray.

Power is transmitted from this driving means 23—24 to the two lifter devices 25 and 26 through automatic power lift clutches 31 and 32, individual respectively to the lifter devices 25 and 26. The bevel gear 24 meshes with a companion bevel gear 33 which is secured to a shaft 34 extending substantially along a line longitudinally of the tractor and journaled in bearings 35 and 36 in the upper housing section. Carried by this shaft is a worm 37 which meshes with a worm wheel 38 mounted coaxially of the power lift clutch 31. This worm wheel 38 is normally continuously rotated through the train of power transmitting parts just described and serves to normally continuously rotate the driving element of the clutch 31. The other clutch 32, for actuating the rear lifter device 26, may also have its driving element driven by a like arrangement of worm 37 and worm wheel 38 individual to this clutch, but I find it preferable to derive its power from the driving element of the first mentioned clutch 31. To this end, the driving element of the front clutch 31 comprises a spur gear 39 which meshes with a spur gear 41 of equal size mounted on the driving element of the rear clutch 32. Aside from the fact that the front clutch is driven through the worm wheel 38, whereas the rear clutch is driven through the spur gear 41, the two clutches are substantially the same, and accordingly I shall only describe one of these clutches in detail. Their directions of rotation are indicated by the arrows, both clutches being mounted on shafts 42 and 43 which are journaled in bearings in the side walls of the lower housing section, the outer ends of these shafts carrying the two power lift cranks 25 and 26 respectively.

In its principle of operation, each clutch is of the conventional half-revolution or one-cycle-stop type. Referring to Figure 2, the rear clutch 32 comprises a sleeve 44 having an integral, radially extending web portion 45 which carries the spur gear 41. The inner corner or edge of the latter is set into an annular groove or recess 46 and is rigidly held in place by transverse rivets 47. This assembly constitutes the constantly rotating or driving element of the clutch. In the case of the front clutch 31, the worm wheel 38 may be similarly set into an annular recess 48 in the opposite side of the web 45 of a sleeve corresponding or similar to the sleeve 44 which is mounted on shaft 42, and secured therein by the rivets 47. In both clutches the sleeve 44 is rotatably mounted upon an inner sleeve 49 which is keyed to its respective shaft as indicated at 51, this inner sleeve constituting part of the intermittently rotating or driven element of the clutch. Extending outwardly from the end of each of these sleeves 49 is a flange or plate portion 52 having diametrically opposite notches 53 in its periphery. Pivotally mounted on the outer face of each plate portion, adjacent to these notches, are dogs 54, 54. Each dog has a pin secured thereto, projecting through an opening in the side plate, and carrying a clutching roller 55 on its inner end. These clutching rollers are adapted to be moved into or out of cooperating notches 56 formed around the inner periphery of the spur gear ring 41, or 39 in the case of the other clutch. The two dogs 54 of each clutch are pivotally connected together for conjoint operation through the cross link 57 and a tension spring 58 connected between one of the dogs and a fixed point on the plate normally tends to swing the two clutching rollers 55 outwardly into clutching engagement with the adjacent notches 56 for coupling the driving and driven elements of the clutch together. The two dogs of the front clutch 31 are normally held in clutch releasing relation by a pawl 59, and similarly the two dogs of the other clutch 32 are normally held in disengaged relation by another pawl 61. When either pawl is engaging in one of the notches 53 it is holding the clutch disengaged by pressure exerted inwardly against the adjacent dog 54, and against a square shoulder 54' on the end of the dog, which holds both dogs in their inwardly swung positions with the clutching rollers 55 out of engagement with the notches 56. The tripping of the pawl outwardly from the notch permits both dogs to swing outwardly under the action of the spring 58, thereby allowing the clutching rollers to engage in the notches, and causing rotation of the driven clutch element until the latter has revolved through a half revolution, when the pawl is allowed to drop into the diametrically opposite notch 53 for automatically releasing the clutch and positively locking the driven clutch element. Each pawl is normally urged inwardly against the plate or disc 52 by a spring 62' acting between the end of the pawl and any suitable abutment point carried by the casing.

The pawl 59 for the front clutch 31 is mounted on a rock shaft 63 which is journaled in the side walls of the lower housing section 18 and has its inner end projecting outwardly of the housing for mounting an actuating lever 64 thereon. A tripping rod 65 is pivotally connected with the arm 64 and extends upwardly and rearwardly to a position for convenient actuation by the operator from his position on the tractor, as shown in Figure 4.

It will be evident that actuation of this rod will rock the shaft 63 and trip the front clutch immediately for instantly starting the raising or lowering of the front cultivator rigs. The rocking movement of the shaft 63 is also transmitted through another arm 66 to a link 67 which is pivotally connected therewith and which extends upwardly along the inner side of the housing. The other pawl 61, associated with the rear clutch 32, is mounted on a rock shaft 68 suitably journaled in the housing and carrying an operating arm 69. Actuation of the latter pawl is effected through a link 71 which is pivotally connected with the arm 69, such link being actuated by a timing device generally indicated at 72, which timing device is tripped by the motion of the other link 67.

This timing control mechanism is mounted on a drum 73, from the opposite ends of which trunnion pins 74 project in eccentric relation to the drum, these trunnion pins being journaled in bearing bosses in the inner and outer walls of the upper housing section 17. By reason of this mounting on the aligned trunnion pins the drum 73 has an eccentric or oscillatory swinging motion toward and away from the longitudinal shaft 34 disposed directly below the timing mechanism. A worm wheel 75, in the form of a ring gear, is rotatably mounted on this eccentric shaft or drum 73, and such worm wheel is adapted to be moved into and out of mesh with a worm 76 on the shaft 34, in the eccentric swinging motion of the mounting member 73. Such member is given this motion by an arm 77 which is secured to the projecting end of the inner trunnion pin 74, on the outside of the housing, see Figure 2. A transverse pin 78 mounted in the outer end of said arm establishes an operative connection with the link 67 through engaging in a slot 79 in the end of said link (Figure 1). Normally the pin engages against the upper end of said slot, and it will be evident that when the pawl 59 is tripped to engage the front clutch 31, the resulting pull exerted through the link 67 will rock the arm 77 and eccentric mounting member 73 in a downward direction to bring the worm wheel 75 down into mesh with the worm 76. The range of movement of the arm 77 is determined by pin 78 engaging opposite ends of the slot 79, and the movement of said arm into either of these two extreme positions is completed and made more rapid through the action of a biasing spring arrangement connected with the outer end of said arm. As shown in Figure 2, a T-shaped fitting 81 is rockably mounted on the inwardly projecting end of the pin 78, and a rod 82 (Figure 1) is constructed as a rigid extension of the angle portion of the fitting, this rod having sliding support in a guide sleeve 83. Said guide sleeve is pivotally supported at 84 on the side of the housing for vertical rocking movement, and confined between said sleeve and the T-shaped fitting 81 is a compression spring 85. It will thus be seen that the spring 85 tends to force the pin 78 out against the adjacent end of the slot 79, and that when this pin passes to the other side of a center line extended between the axes of the pivots 74 and 84, the spring 85 will have a biasing action for snapping the pin 78 out against the other end of the slot 79.

As soon as the worm wheel 75 is swung down into mesh with the worm 76, in which position it is yieldingly held by the biasing action of the spring 85, it begins to rotate in a clockwise direction, and after a predetermined interval of such rotation its movement is transmitted to an arm 86 which in turn actuates the link 71 through the pivotal connection 87 therewith, whereby the pawl 61 of the rear clutch is tripped. The arm 86 is formed as an outwardly extending projection at one end of a sleeve 88 which is rotatably mounted on the eccentric drum or shaft 73. This sleeve is held against endwise movement along said drum by two collars or sleeves 89 and 91, both of which are rigidly secured to the eccentric drum 73. The worm wheel 75 is rotatably mounted on the outer surface of the sleeve 88. A lost motion tripping arrangement is established between the worm wheel 75 and the actuating arm 86 through the provision of a small block 92 which is secured to the side of the worm wheel by the screws 93. This block normally occupies the position approximately indicated in Figure 1, and when the worm wheel starts to rotate in its clockwise direction this block is revolved around and into engagement with a shoulder or face 94 on one side of the arm 86, whereupon the arm is compelled to move with the gear, thereby transmitting tripping movement to the pawl 61. It will be apparent that a predetermined time interval will elapse between the initial meshing of the worm wheel with the worm 76 and the time when the block 92 will have engaged the face 94 and oscillated the arm 86 sufficiently to trip the pawl 61. This time interval may be adjusted by adjustably positioning the block 92 at different angular locations on the side of the worm wheel 75. The other pairs of screw holes 93', for receiving the screws 93, indicate other positions in which the block 92 may be set for different time intervals between the tripping of the front clutch and the tripping of the rear clutch.

Sufficient angular motion is imparted to the arm 86 to trip the pawl 61, and thereafter continued motion of said arm is effective to swing the eccentric drum 73 upwardly and thereby carry the worm wheel 75 out of mesh with the worm 76. This is effected through a lug or shoulder 95 extending from the arm or ring member 88 and adapted to abut a cooperating lug 96 projecting from the collar 91, which collar it will be remembered is secured fast to the eccentric mounting member 73. The engagement of the lug 95 against the lug 96 transmits swinging movement to the mounting member, and shortly after the pawl 61 is tripped this swinging movement will have caused the arm 77 to carry its pivot 78 past the neutral or biasing center line, whereupon the spring 85 will snap the pivot pin 78 out to the outer end of the slot 79, thereby swinging the worm wheel 75 up out of mesh with the worm 76 and interrupting further clockwise movement of the worm wheel and arm 86.

It is now desirable to rotate the worm wheel and tripping arm 86 back to their original positions for the purpose of preparing the timing device for another operation, and also for the purpose of swinging the square nose of the pawl 61 back into yielding engagement with the periphery of the cooperating plate 52, in condition for dropping into the next notch 53 when that notch shall have rotated around to clutch releasing position. This resetting of the parts is accomplished through a helical spring 97 (Figure 5) which surrounds the eccentric drum 73, between the worm wheel 75 and the adjacent side wall of the housing. One end of this spring is anchored in the worm wheel and the other end is anchored in the eccentric drum, substantially as shown. As the worm wheel 75 is rotated in a clockwise direction, in its clutch tripping operation, energy is stored up in the spring 97, and when the worm wheel is swung up out of mesh with its driving worm 76 at the conclusion of the clutch tripping operation this spring energy quickly revolves the worm wheel in a counter-clockwise direction back to its original position. In this backward rotation a second block 98, which is secured to the side of the worm wheel by the screws 99, is brought up against a shoulder 100 on the other side of the actuating arm 86. When the first mentioned block 92 revolves backwardly away from the shoulder 94 the arm 86 is free to be swung in a counter-clockwise direction under the force of the right hand spring 62' which forces its pawl 61 down against the solid portion of the associated clutch disc 52.

When the second block 98 has revolved back against the other shoulder 100 of the tripping arm 86 the pressure of the helical spring 97 also acts in the same direction on said arm. Hence when the opposite notch 53 of the clutch disc comes under the nose of the pawl 61 the pawl swings into clutch releasing position in said notch, thereby permitting the arm 86 to oscillate slightly further in its counter-clockwise movement, the worm wheel also following up this movement with the block 98 in engagement with the shoulder 100, which brings all of the parts back to their original positions.

In briefly summarizing the operation of the device, it will be seen that when the operator actuates the manual control device 65 the front clutch 31 is instantly tripped to engage the same, and simultaneously therewith the worm wheel 75 is swung down into mesh with the worm 76 whereupon the worm wheel begins to rotate in its timing function. After the lapse of the desired time interval the block 92 engages the shoulder 94 and moves the arm 86 to trip the rear clutch 32. After the latter clutch has been tripped the continued motion of the worm wheel and arm 86 operates through the cooperating stops 95, 96 to oscillate the eccentric mounting member 73, whereby the worm wheel is swung up out of mesh with the worm 76, and is allowed to be returned to its initial position under the energy stored in the spring 97. This same operation occurs when the clutches are tripped for raising the implements and when they are tripped for lowering the implements. The time interval elapsing between the tripping of the front clutch and the tripping of the rear clutch is proportioned to the longitudinal distance between the front set of cultivator rigs and the rear set of rigs, or other implement parts, so that the points at which the rear rigs leave the ground and enter the ground correspond substantially to the points of leaving and entering of the front rigs. Where, because of differences in the length of the tractor, or in the arrangement of the two sets of rigs relative thereto, the distance between the front and rear sets of rigs varies appreciably in different installations, appropriate adjustments may be made therefore by shifting the block 92 to other angular positions on the worm wheel 75, represented by the other pairs of screw holes 93'. The longitudinal shaft 34 preferably has its ends projecting beyond the front and rear walls of the housing, as indicated at 34'. These projecting ends can be coupled with suitable power transmission shafts for transmitting rotary take-off power to implement parts disposed at the front end or the rear end of the tractor or both. This shaft rotates continuously in the use of the power take-off device and can be used to transmit power take-off energy independently of or simultaneously with the use of the two clutches. Obviously, either clutch may be used independently of the other, as when only one set of implement parts is associated with the tractor, or when all of the implement parts are to be actuated in unison.

I do not claim here any of the features disclosed and claimed in prior patent to Theodore W. Johnson and myself, but I believe the general idea of lifting different implement parts and/or lowering different implement parts in timed sequence to be broadly new, and it is to be understood that the appended claims should therefore be construed accordingly.

I claim:

1. The combination with a tractor, of power take-off mechanism associated with the tractor comprising two power operated devices comprising driving and driven parts adapted to transmit energy to separate implement parts, means for causing actuation of the driven part of one of said power devices, and means for causing operation of the driven part of the other of said power devices in timed sequence thereto, said driving parts being associated together whereby one device derives its power from the other.

2. The combination with a tractor comprising a motor, of power take-off mechanism on the tractor comprising two cooperating individual power take-off devices adapted to transmit energy to different implement parts, means for driving the first one of said devices by power derived from said tractor, manually operated means adapted to initiate the operation of said first one of said power take-off devices by said driving means, a second means connected to and operated by said driving means for driving said second device, and means operating automatically at a predetermined time thereafter to initiate the operation of the other of said power take-off devices by said second driving means.

3. The combination with a tractor, of power lift mechanism associated with the tractor comprising two individual lifter devices adapted to transmit lifting energy to separate implement parts, means for controlling and operating the first one of said lifter devices, driving means for the second one of said devices which derives power from said first means, and timing mechanism for controlling said driving means to cause the other one of said lifter devices to be actuated after the lapse of a predetermined interval.

4. The combination with a tractor comprising a motor, of power take-off mechanism on the tractor comprising two individual power take-off devices comprising driving members deriving power from said motor and driven members adapted to transmit energy to different implement parts, means for causing the driving member of one of said power take-off devices to operate its driven member, and timing mechanism deriving power from said motor and operating automatically to cause the driven member of the other of said power take-off devices to be actuated after a definite time interval by power supplied to its driving member through said first driving member.

5. The combination with a tractor, of power take-off mechanism associated with the tractor comprising two individual clutches adapted to transmit energy to different implement parts, means movable for engaging one of said clutches, and means effective upon movement of said engaging means and operating automatically thereafter to cause engagement of the other of said clutches.

6. The combination with a tractor, of power lift mechanism associated therewith comprising two automatically releasing power lift clutches adapted to transmit lifting energy to different implement parts, means for causing engagement of one of said clutches, and timing mechanism operating concurrently with said latter clutch for automatically causing engagement of the other clutch after a time interval.

7. The combination with a tractor, of power lift mechanism associated therewith comprising two power lift clutches adapted to transmit lifting energy to different implement parts, means for causing the engagement of one of said clutches, timing mechanism operative thereafter automatically to cause engagement of the other of said clutches after a time interval, and means for automatically restoring said timing mechanism to initial position.

8. The combination with a tractor, of power take-off mechanism associated with the tractor comprising two clutches adapted to transmit energy to different implement parts, separate tripping devices for causing engagement of the respective clutches, means for manually actuating one of said tripping devices to engage one of said clutches, a timing device set into motion substantially with the tripping of said latter clutch, and lost motion means associated with said timing device and operative after a predetermined degree of movement of said device to automatically actuate the tripping device of the other clutch.

9. The combination with a tractor, of power lift mechanism associated therewith comprising two power lift clutches adapted to transmit lifting energy to different implement parts, separate tripping devices for causing engagement of the respective clutches, means for manually actuating one of said tripping devices to engage one of said clutches, a rotating timing element automatically set into rotation substantially simultaneously with the tripping of said latter clutch, and means operative after said timing element has rotated through a predetermined degree of movement to actuate the tripping device of the other clutch.

10. The combination with a tractor, of power take-off mechanism associated therewith comprising driving means driven from the motor of the tractor, two clutches adapted to be driven by said driving means to transmit energy to different implement parts, separate tripping devices for causing engagement of the respective clutches, means for manually actuating one of said tripping devices to engage one of said clutches, timing mechanism comprising a moving element, means operative substantially simultaneously with the engagement of the aforesaid clutch to transmit power from said driving means to said moving element for causing motion of the latter, means effective after said moving element has traveled through a predetermined motion for actuating the tripping device of the other clutch, and means for automatically restoring said moving element to its initial position after the latter clutch has been tripped.

11. The combination with a tractor comprising a motor, of power take-off mechanism mounted on the tractor and comprising driving means driven from said motor, two clutches adapted to be driven from said driving means and to transmit energy to different implement parts, separate tripping devices for causing engagement of the respective clutches, means for actuating one of said tripping devices to engage one of said clutches, timing mechanism comprising a driven gear movable into and out of mesh with a driving gear rotated by said driving means, means for causing meshing of said gears substantially when the last named clutch is engaged, lost motion means cooperating with said driven gear for actuating the tripping device of the other of said clutches after said gear has traveled through a predetermined motion, means for separating said gears after the latter clutch has been engaged, and means for automatically restoring said driven gear to its original position.

12. The combination with a tractor comprising a motor, of power take-off mechanism mounted on the tractor comprising driving means deriving power from the motor, two automatically releasing clutches adapted to be driven by said driving means, means for initially engaging one of said clutches, a pair of gears one of which is driven by said driving means, an eccentric mounting for one of said gears by the actuation of which said gears are moved into and out of mesh, means operative through said eccentric mounting to move said gears into mesh after the last named clutch has been engaged, means actuated by one of said gears for causing engagement of the other clutch after a time interval, means operative thereafter through said eccentric mounting to move said gears out of mesh, and means for automatically restoring one of said gears to its initial position.

13. The combination with a tractor comprising a motor, of power take-off mechanism associated with the tractor comprising driving means driven by the motor, two clutches adapted to be driven by said driving means for transmitting power take-off energy to different implement parts, means for causing engagement of one of said clutches, and timing mechanism for automatically causing the engagement of the second clutch in delayed sequence after the engagement of the first clutch, said timing mechanism comprising a driving member actuated by said driving means, a cooperating driven member, movable mounting means for one of said members permitting relative movement therebetween to establish or interrupt an operative engagement between said members, means operated by the engagement of the first clutch for actuating said movable mounting means to establish operative engagement between said driving and driven members, means actuated after a predetermined motion of said driven member to cause engagement of the second clutch, means responsive to continued movement of said driven member for moving said mounting means in the opposite direction to separate said members, and biasing means influencing the movement of said movable mounting means.

14. The combination with a tractor comprising a motor, of power take-off mechanism associated with the tractor comprising two clutches adapted to transmit energy to different implement parts, means for effecting engagement of one of said clutches, and timing mechanism for thereafter automatically effecting the engagement of the other of said clutches, said timing mechanism comprising a worm driven by the tractor motor, a worm wheel adapted to mesh therewith, means actuated by the engagement of the first clutch for causing relative movement between said worm and worm wheel to bring the two into mesh, and means responsive to predetermined motion of said worm wheel for effecting engagement of the other clutch.

15. In a wheeled vehicle comprising two separately operable implement parts, the combination of lifting mechanism adapted to lift one of said implement parts, and means for thereafter automatically lifting the other implement part when the vehicle has traveled a predetermined distance, said means including individual lifting means individually mounted and driving members therefor intercorrected whereby one of said driving members is operated by power derived from the other.

16. In an implement comprising two implement parts operating at different times, the combination of means responsive to manual operation for causing the operation of one of said implement parts, and means responsive to said manual operation of the aforesaid means for thereafter automatically causing the operation of the other implement part after a predetermined time interval.

17. The combination with a tractor comprising a motor, of power take-off mechanism on the tractor comprising a constantly rotating element adapted to be driven by the motor, and clutch mechanism comprising two intermittently operable elements positioned on opposite sides of said constantly rotating element and driven by said rotating element, whereby power take-off energy can be transmitted by said constantly rotating element independently of or simultaneously with the use of one or both of said clutch elements.

18. A power lift mechanism comprising a first and second half revolution clutch, each clutch comprising an optionally operable element, means for initiating the operation of the operable element of the first clutch, and means automatically responsive to the initiation of the operation of the operable element of the first clutch for initiating the operation of the operable element of the second clutch a predetermined time interval thereafter.

19. In combination, a first and second clutch mechanism, each mechanism comprising an intermittently operable element, means for operating said mechanisms, a control mechanism, means for initiating the operation of the operable element of said first clutch, means for setting said control mechanism into operation at the initiation of the operation of the operable element of said first clutch, and means responsive to the operation of said control mechanism to a certain position for initiating the operation of the operable element of said second clutch.

20. In combination, a first and a second clutch mechanism, each mechanism comprising an intermittently operable element, means for operating said mechanisms, an operable control mechanism normally in one position, means for initiating the operation of the operable element of said first clutch, means for setting said control mechanism into operation at the initiation of the operation of the operable element of said first clutch, means responsive to the operation of said control mechanism to a certain position for initiating the operation of the operable element of said second clutch, means for interrupting the operation of said control mechanism after it has operated to a certain other position, and means for restoring said control mechanism to normal.

21. In an implement comprising a movable implement part, the combination of driving means, a clutch driven by said means and adapted to actuate said part, means normally out of cooperative relationship with said driving means and adapted for manual initiation of movement into cooperative relationship therewith for automatically effecting engagement of said clutch a predetermined time interval thereafter, and means for automatically restoring said means for effecting engagement to its normal position after it has effected engagement of said clutch.

22. The combination with a tractor, of power lift mechanism associated with the tractor comprising two lifter devices comprising driving elements actuated by power from the tractor and driven elements adapted to transmit lifting energy to separate implement parts, means for actuating one of said lifter devices, and means responsive to the actuation of said lifter device operating automatically to effect actuation of the other of said lifter devices in timed sequence after the actuation of said first lifter device by power derived from said tractor through the driving element of said first lifter device.

23. The combination with a tractor, of power lift mechanism associated with the tractor comprising two lifter devices containing driving elements actuated by power from the tractor and driven elements adapted to transmit lifting energy to separate implement parts, actuating means for one of said lifter devices, and means effective upon operation of said actuating means operating automatically to cause actuation of the other of said lifter devices, in timed sequence after the actuation of said first lifter device, by power derived from the tractor through the driving element of said first lifter device.

24. The combination with a tractor, of power lift mechanism associated with the tractor comprising two lifter devices comprising driving elements actuated by power from the motor of the tractor and driven elements adapted to transmit lifting energy to separate implement parts, manually operated means for causing one of said lifter devices to operate, and automatic means for causing the other of said devices to be operated by power derived from said tractor through the driving element of said first lifter device in timed sequence.

25. The combination with a tractor, of power lift mechanism associated with the tractor comprising two lifter devices adapted to transmit lifting energy to separate implement parts, actuating means for one lifter device, means connected in tandem with said first actuating means for actuating the second lifter device, and means operating automatically to effect actuation of said second lifter device in timed sequence after the first.

26. The combination with a tractor, of power lift mechanism associated with the tractor comprising two lifter devices adapted to transmit lifting energy to separate implement parts, actuating means for one lifter device, means connected in tandem with said first actuating means for actuating the second lifter device, and means effective under the control of the first actuating means operating automatically to cause actuation of said second lifter device in timed sequence after the first.

27. In a wheeled device comprising a plurality of ground engaging implement parts, the combination of power driven means, individual lifting mechanisms mounted upon separate shafts, means connecting said mechanisms to said implement parts, and means connected in tandem between said mechanisms and said driven means for operating said mechanisms to lift said implement parts in successive sequence.

28. A multiple power lift mechanism comprising a plurality of individual lifting devices, a driving device for each lifting device, said driving devices being connected together in tandem, a source of power connected to the first one of said driving devices, means for connecting each lifting device to the associated driving device, and manually initiated automatically operating means for actuating said connecting means sequentially.

29. The combination with a tractor comprising a motor having a housing, of a power take-off mechanism in the form of an attachment comprising a housing detachably connected to the motor housing and including a continuously rotating shaft journaled in the attachment housing and driven by the motor of the tractor, a worm on said shaft within said attachment housing, a worm gear continuously driven by said worm, a ring member secured to said worm gear and having internal corrugations, a clutch mechanism comprising an intermittently rotatable element having a dog associated therewith adapted to engage said internal corrugations to transmit power from said ring member to said intermittently rotatable member, and another clutch mechanism including a similar ring member and intermittently rotatable elements having a dog adapted to engage the internal corrugations thereof, said latter ring member being continuously rotated by power transmitted through said worm gear, whereby both said intermittently rotatable elements receive power from said continuously rotating shaft through the same worm gear.

30. The combination with a tractor comprising a motor having a housing, of a power take-off mechanism in the form of an attachment comprising a housing detachably connected to the motor housing and including a continuously rotating shaft rotatably supported in the attachment housing and driven by the motor of the tractor, a worm gear, means for driving said worm gear from said shaft, a ring member secured to said worm gear and having internal corrugations, a clutch mechanism comprising an intermittently rotatable element having a dog associated therewith adapted to engage said internal corrugations to transmit power from said ring member to said intermittently rotatable member, and another clutch mechanism including a similar ring member and intermittently rotatable elements having a dog adapted to engage the internal corrugations thereof, said latter ring member being continuously rotated by power transmitted through said worm gear, whereby both said intermittently rotatable elements receive power from said continuously rotating shaft through the same worm gear.

31. The combination with a tractor comprising a motor having a housing, of an attachment housing detachably connected to the motor housing and having power take-off mechanism mounted therein and operatively connected to the tractor motor, said power take-off mechanism including a shaft driven from the tractor motor, a continuously driven worm, a worm gear meshing with said worm, a ring member secured to said worm gear and having internal corrugations, a clutch mechanism comprising an intermittently rotatable element having a dog associated therewith adapted to engage said internal corrugations to transmit power from said ring member to said intermittently rotatable member, and another clutch mechanism including a similar ring member and intermittently rotatable elements having a dog adapted to engage the internal corrugations thereof, said latter ring member being continuously rotated by power transmitted through said worm gear, whereby both said intermittently rotatable elements receive power from said continuously driven worm through the same worm gear.

THEOPHILUS BROWN.

CERTIFICATE OF CORRECTION.

Patent No. 2,031,758.                                     February 25 1936.

THEOPHILUS BROWN.

It is hereby certified that error appears in the printed specification of the above numbered patent requiring correction as follows: Page 5, first column, line 40-41, claim 1, for the word "device" read part; page 6, second column, line 23, claim 15, for "intercorrected" read interconnected; and that the said Letters Patent should be read with these corrections therein that the same may conform to the record of the case in the Patent Office.

Signed and sealed this 21st day April, A. D. 1936.

Leslie Frazer (Seal)                                     Acting Commissioner of Patents.

therein and operatively connected to the tractor motor, said power take-off mechanism including a shaft driven from the tractor motor, a continuously driven worm, a worm gear meshing with said worm, a ring member secured to said worm gear and having internal corrugations, a clutch mechanism comprising an intermittently rotatable element having a dog associated therewith adapted to engage said internal corrugations to transmit power from said ring member to said intermittently rotatable member, and another clutch mechanism including a similar ring member and intermittently rotatable elements having a dog adapted to engage the internal corrugations thereof, said latter ring member being continuously rotated by power transmitted through said worm gear, whereby both said intermittently rotatable elements receive power from said continuously driven worm through the same worm gear.

THEOPHILUS BROWN.

CERTIFICATE OF CORRECTION.

Patent No. 2,031,758.      February 25 1936.

THEOPHILUS BROWN.

It is hereby certified that error appears in the printed specification of the above numbered patent requiring correction as follows: Page 5, first column, line 40-41, claim 1, for the word "device" read part; page 6, second column, line 23, claim 15, for "intercorrected" read interconnected; and that the said Letters Patent should be read with these corrections therein that the same may conform to the record of the case in the Patent Office.

Signed and sealed this 21st day April, A. D. 1936.

Leslie Frazer (Seal)      Acting Commissioner of Patents.